Sept. 29, 1936.   H. W. GRIMM   2,056,099
PISTON OIL RING
Filed May 26, 1934
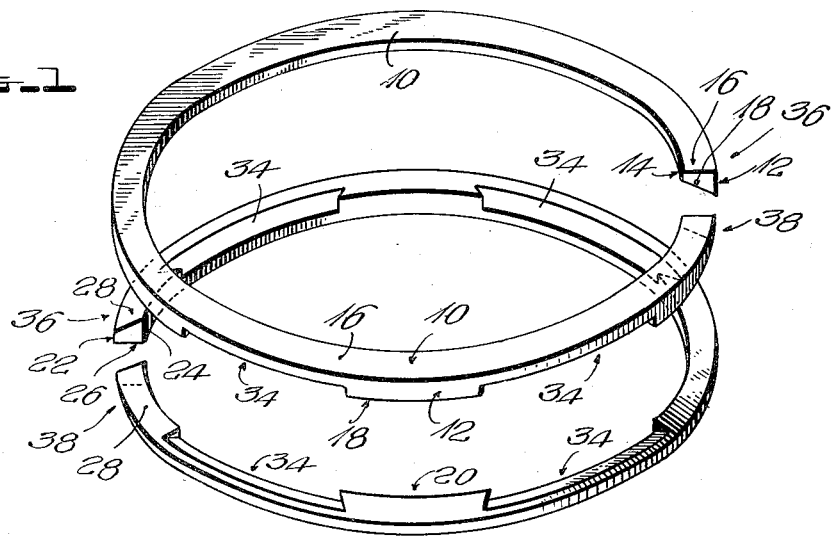
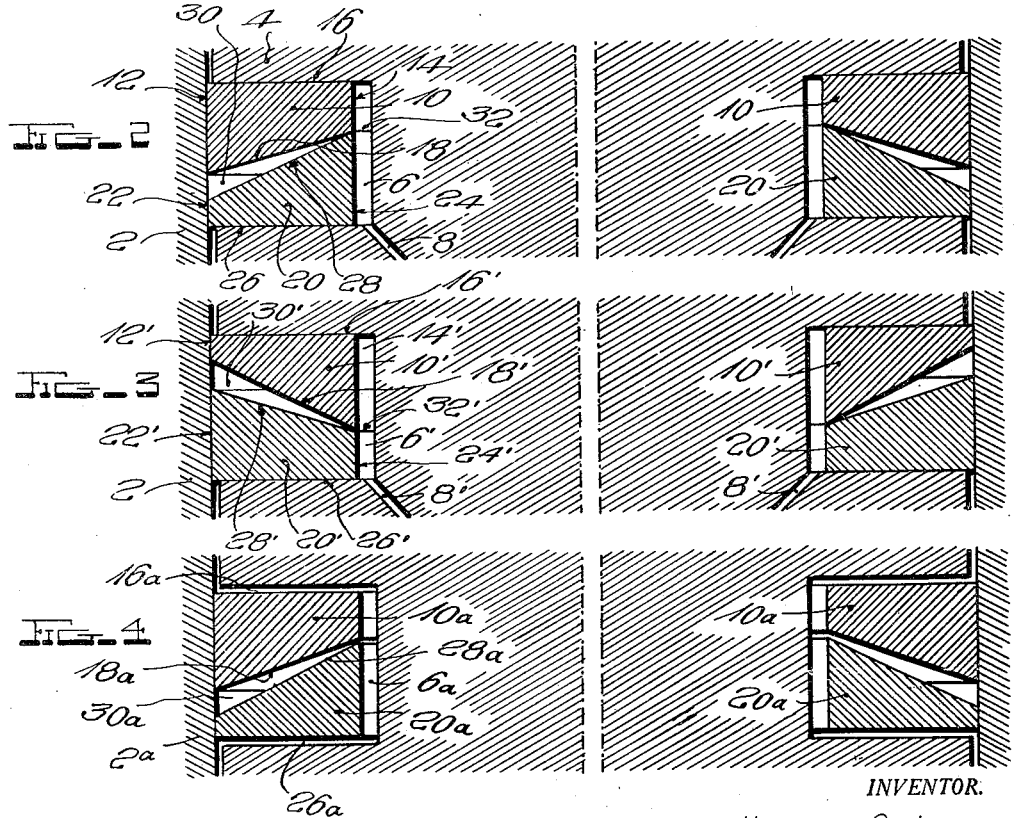
INVENTOR.
BY Henry W. Grimm
Fisher Pedersen,
ATTORNEYS.

Patented Sept. 29, 1936

2,056,099

UNITED STATES PATENT OFFICE 2,056,099

PISTON OIL RING

Henry W. Grimm, Tulsa, Okla.

Application May 26, 1934, Serial No. 727,821

6 Claims. (Cl. 309—45)

This invention is an oil ring for a piston, particularly for pistons in internal combustion engines.

An important object of the invention is to provide an oil ring consisting of two members which define between them a wedge shaped slot, the maximum opening of which is at the cylinder wall and the apex or terminus of which is at the extreme inner edges of the two ring members.

Another important object of the invention is to provide an oil ring composed of two members having oppositely beveled faces, beveled at different angles, the bevel extending uniformly from the outer or cylinder-engaging wall of each member to the inner edge of each member, so that the two members contact only at their extreme inner edges. There is thus produced a mutual and oppositely directed wedging effect, one member being wedged outwardly while the other member is wedged inwardly. One member, therefore, is always being forced into tight engagement with the cylinder wall.

Due to the shape and conformation of the rings, and to the fact the rings may, if desired, be floating, the rings of this invention may be termed "prismoid rings, full floating".

More particularly, the oil ring of this invention is formed of two members of the same general shape in cross section, but reversed, the two members being each substantially in the shape of a trapezoid, the long edges of the trapezoid being placed adjacent one another but not in contact, the long edges of the trapezoid being at slightly different angles so that they form between them a wedge shaped slot extending substantially from the cylinder wall diagonally inwardly and uniformly to the extreme inner edge of the two ring members. In other words, it will be seen that the two ring members contact only at their extreme inner edges along a circumferential line. This inner circumferential contact is an important feature of the invention, one important result of such an arrangement being the wedging action in opposite directions, due to the oppositely inclined beveled faces of the two portions of the ring, whereby one portion of the ring is forced inwardly, while the other portion is forced outwardly.

The invention will now be further described in connection with the accompanying drawing, illustrating the present preferred embodiment of the invention.

In the drawing:

Fig. 1 is a perspective view of the two ring members forming together the prismoid ring, the two ring members being shown separated;

Fig. 2 is a cross sectional view, on a larger scale, of the oil ring in place in a piston;

Fig. 3 is a similar view of a modification; and

Fig. 4 is a similar view showing the full floating type of ring.

Referring now to the drawing in which similar reference characters indicate similar parts, the cylinder wall is indicated at 2 and the piston at 4. The piston is provided with the usual annular groove 6 and several oil drain holes 8. The groove 6 is preferably substantially rectangular in cross section.

The upper part of the oil ring is shown at 10, this member being substantially in the shape of a trapezoid in cross section, the outer or cylinder engaging portion of which is indicated at 12 and the inner edge of which is indicated at 14; its upper edge 16 engages with the upper wall of the groove 6. An important feature of the member 10 is that its lower face 18 is beveled, the bevel extending from the outer edge 12 to the inner edge 14.

The lower member 20 of the oil ring is provided with a cylinder engaging portion 22, and an inner edge portion 24; its lower edge 26 engages with the lower wall of the piston groove. This lower member is provided also with a beveled surface 28 extending from the cylinder engaging portion 22 diagonally to the inner edge 24, the two surfaces 18 and 28 defining between them a wedge-shaped annular slot 30, the sides of which in cross section are substantially straight, the maximum opening of which is at the cylinder wall and the apex or terminus of which is at the point or line 32 at the extreme inner edges of the two ring members. The wedge-shaped slot 30 quickly fills with oil and remains filled with oil during operation of the piston, thereby keeping the cylinder wall properly lubricated, the presence of the oil also aiding in maintaining a gas tight seal.

The preferred angle of the slot 30 is approximately 3° although, of course, this may be varied considerably without departing from the spirit of the invention.

It will be noted from the foregoing that each of the two parts 10 and 20 of the oil ring have cylinder engaging portions 12 and 22 of substantial area and that the two members contact each other only at the extreme inner edges thereof, along the line 32. With the described construction there is a mutual wedging effect between the two members 10 and 20 which is equal and opposite, the result of which is that as the rings push against each other, member 10 is forced outwardly into contact with the cylinder wall, while member 20 is forced in the opposite direction, toward the inside of the groove 6. This wedging effect is continuous and serves to maintain the member 10 in tight contact with the cylinder wall even if the cylinder wall and ring wears.

The inner contacting edges of the two rings, shown at 32, may if desired be provided with several small cut-away portions 34 which provide for oil drainage. The ends 36 and 38 of the two members may be of the overlapping or butt type, as desired, as is well understood in this art.

It is also within the contemplation of the invention to reverse the angular arrangement of the two ring members; this reversal is shown in Fig. 3, corresponding elements being indicated by corresponding primed reference characters. The same type of mutual wedging described in connection with Fig. 2 occurs with the construction of Fig. 3. In this case, due to the reversal, the member 20' on both the upward and down stroke of the piston, is forced outwardly into contact with the cylinder wall, while, at the same time, the other member 10' is forced toward the inside of the groove 6'.

With the constructions shown in both Figs. 2 and 3, that member which has its wider face in engagement with the cylinder wall is forced outwardly against said wall.

In Fig. 4, the groove 6ª in the piston is shown larger than in the other figures, so that the two ring elements 10ª and 20ª may "float" in the groove. The other parts correspond to the parts in Fig. 2, and are designated by corresponding reference characters followed by "a". An oil drain, such as 8, Fig. 2, is preferably not used with this form of the invention.

The natural resilience of the rings keeps them pressed outwardly into contact with the cylinder wall, and this contact is maintained even as the rings wear, due to their wedging effect on each other. The fact that the two rings contact only at their extreme inner edges is a particularly important feature of the invention; and the wedge shaped oil slot 30, extending from the cylinder wall to the extreme inner edge of the ring, is also an important feature of the invention, in that it serves as an oil accumulating pocket serving to keep the cylinder walls lubricated.

I claim as my invention:

1. A two part oil ring for a piston, comprising in combination two members the adjacent surfaces of which are beveled at slightly different angles, said beveled surfaces extending from the outer, cylinder-engaging portions of the members diagonally inwardly to the extreme inner edges of the two members, the two beveled surfaces defining between them an oil slot, wedge shaped in cross section, said slot having its maximum opening at the cylinder wall and its apex at the inner edges of the two said members, the two members contacting with each other only at the extreme inner edges thereof, at the terminus of said wedge-shaped slot.

2. A two part oil ring for a piston, comprising in combination two members the adjacent surfaces of which are beveled at slightly different angles, said beveled surfaces extending from the outer, cylinder-engaging portions of the members diagonally inwardly to the extreme inner edges of the two members, the two beveled surfaces defining between them an oil slot, wedge shaped in cross section, the side walls of the slot, viewed in cross section, being substantially straight, said slot having its maximum opening at the cylinder wall and its apex at the inner edges of the two said members, the two members contacting with each other only at the extreme inner edges thereof, at the terminus of said wedge-shaped slot.

3. A two part oil ring for a piston, comprising in combination two members the adjacent surfaces of which are beveled at slightly different angles, said beveled surfaces extending from the outer, cylinder-engaging portions of the members diagonally inwardly to the extreme inner edges of the two members, the two beveled surfaces defining between them an oil slot, wedge shaped in cross section, the side walls of the slot, viewed in cross section, being substantially straight and defining between them an angle of approximately 3°, said slot having its maximum opening at the cylinder wall and its apex at the inner edges of the two said members, the two members contacting with each other only at the extreme inner edges thereof, at the terminus of said wedge-shaped slot.

4. A two part oil ring for a piston, comprising in combination two ring members each shaped in cross section substantially like a trapezoid, one of the angles of which is a right angle, the two rings being assembled in the usual groove of the piston with the parallel sides of the trapezoids parallel to the cylinder walls and with the long edges of the trapezoids adjacent, the long edges of the trapezoids being at different angles so that the two rings contact only at their inner edges, the two angular faces of the rings forming between them an oil slot, diverging outwardly from the inner line of contact of the two rings and extending substantially to the cylinder wall.

5. A two part oil ring for a piston, comprising in combination two ring members each shaped in cross section substantially like a trapezoid, one of the angles of which is a right angle, the two rings being assembled in the usual groove of the piston with the parallel sides of the trapezoids parallel to the cylinder walls and with the long edges of the trapezoids adjacent, the long edges of the trapezoids being at different angles so that the two rings contact only at their inner edges, the two annular faces of the rings forming between them an oil slot, the angular opening of which is about 3°, the sides of said slot diverging outwardly from the inner line of contact of the two rings and extending substantially to the cylinder wall.

6. A full floating prismoid oil ring for a piston, comprising in combination two annular members each shaped in cross section substantially like a trapezoid, the two members being assembled reversely, one member having its wide edge outermost, while the other has its wide edge innermost, the adjacent faces of the two members being inclined at different angles so as to form between them a wedge-shaped oil slot which extends from the outer or cylinder-wall engaging part of the ring diagonally inwardly to its apex at the extreme inner edges of the two annular members, at least one of said annular members being provided with oil drainage passages.

HENRY W. GRIMM.